United States Patent [19]

Ueki et al.

[11] Patent Number: 4,826,735

[45] Date of Patent: May 2, 1989

[54] POLYPROPYLENE RESIN COMPOSITION, A MULTI-LAYERED SHEET COMPRISED THEREOF AND A PRODUCTION PROCESS THEREFORE

[75] Inventors: Toru Ueki, Yokohama; Jinichi Yazaki, Tokyo; Akihiko Tamura, Chigasaki; Hideo Amemiya, Yokohama; Takashi Miyazaki, Tokyo, all of Japan

[73] Assignees: Mitsui Toatsu Chemicals, Incorporated; Toyo Seikan Kaisha Ltd., both of Tokyo, Japan

[21] Appl. No.: 905,507

[22] Filed: Sep. 10, 1986

[30] Foreign Application Priority Data

Sep. 20, 1985 [JP] Japan ................................. 60-206400

[51] Int. Cl.$^4$ ........................ B32B 27/08; B32B 27/32; B32B 27/34; C08K 3/22
[52] U.S. Cl. .................................. 428/476.1; 428/515; 428/523; 524/394; 524/397; 524/399; 524/400; 524/433; 524/436; 524/503; 524/514
[58] Field of Search ............... 524/399, 400, 583, 433, 524/503, 514, 397, 436; 428/476.1, 515, 523

[56] References Cited

U.S. PATENT DOCUMENTS

| 3,238,163 | 3/1966 | O'Neill et al. | 524/399 |
|---|---|---|---|
| 4,251,407 | 2/1981 | Schroeder et al. | 524/400 |
| 4,269,744 | 5/1981 | Hulyalkar et al. | 260/23 |
| 4,613,644 | 9/1986 | Moritani et al. | 524/436 |
| 4,629,596 | 12/1986 | Coffman | 524/436 |

FOREIGN PATENT DOCUMENTS

| 27537 | 3/1974 | Japan | 524/399 |
|---|---|---|---|
| 67758 | 6/1978 | Japan | 524/399 |
| 16583 | 7/1979 | Japan . | |
| 54-87783 | 7/1979 | Japan . | |
| 55-93449 | 7/1980 | Japan . | |
| 141341 | 11/1981 | Japan | 524/400 |
| 223743 | 12/1984 | Japan | 524/399 |
| 199040 | 10/1985 | Japan | 524/400 |
| 1221248 | 10/1986 | Japan | 524/436 |

*Primary Examiner*—Lewis T. Jacobs
*Assistant Examiner*—David W. Woodward
*Attorney, Agent, or Firm*—Fisher, Christen & Sabol

[57] ABSTRACT

A polypropylene resin composition is provided by incorporating a metal salt of a fatty acid and the oxide or hydroxide of an alkaline earth metal, each, in an amount of 0.05–1 part by weight based on 100 parts by weight of polypropylene. The polypropylene resin composition shows excellent thermal processing stability even when subjected to remelting and extrusion molding after mixing of a scrap recycled from the production of multi-layered containers or sheets each of which is formed of a gas barrier layer made of nylon or an ethylene-vinyl alcohol copolymer and another layer made of a polypropylene resin composition.

5 Claims, No Drawings

POLYPROPYLENE RESIN COMPOSITION, A MULTI-LAYERED SHEET COMPRISED THEREOF AND A PRODUCTION PROCESS THEREFORE

BACKGROUND OF THE INVENTION (a) Field of the Invention

This invention relates to a polypropylene resin composition suitable, for example, as a material for multi-layer molding or forming. More specifically, it relates to a polypropylene resin composition having excellent processability upon its multi-layer molding or forming together with a resin having superb gas barrier properties and chemical resistance, for example, nylon, an ethylene-vinyl alcohol copolymer into containers or sheets and showing no substantial deterioration in properties even when a scrap recycled from the production of the containers or sheets is mixed for its reutilization, multi-layered containers or sheets produced by using the composition, and a production process of such multi-layered containers or sheets.

(b) Description of the Prior Art

Polypropylene has found wide-spread commercial utility as containers for cosmetics, toiletries, chemical reagents and the like owing to its economical price, easy molding and processing, excellent mechanical characteristics, and in addition, superb water vapor permeation resistance, safety and sanitation and so on. However, polypropylene has high permeability to oxygen, carbon dioxide and the like. Under the circumstances, it cannot hence be used to produce containers for materials the qualities of which are affected by oxygen, carbon dioxide or the like permeated through the containers. Another limitation is also imposed on polypropylene as to its use as containers for materials which contain certain kinds of organic solvents such as benzene, toluene or xylene, because the chemical resistance of polypropylene to such solvents is not fully sufficient.

As a solution to these problems, it has been known to use multi-layered or laminated containers or sheets each of which is composed of a layer of a composition of polypropylene and a grafted polypropylene obtained by graft-polymerizing a radicalpolymerizable unsaturated compound having polar groups on polypropylene and another layer of nylon or an ethylene-vinyl alcohol copolymer which has excellent gas barrier properties and chemical resistance.

For example, Japanese Patent Laid-Open Nos. 16583/1979 and 16584/1979 disclose modified polypropylene resin compositions which permit recycling and reutilization of scraps from the production of such multi-layered containers from co-extruded sheets or parisons.

On the other hand, in a multi-layered structure of a polypropylene layer and, for example, another layer of an ethylene-vinyl alcohol copolymer such as an ethylene-vinyl acetate copolymer having an ethylene content of 10–80 mole % and a saponification degree of 90 mole % or more, the bonding strength at their interface is poor. As a solution to this problem, Japanese Patent Laid-Open No. 87783/1979 discloses an attempt to improve the bonding strength by adding various additives, for example, a metal salt of a higher fatty acid and a metal oxide, hydroxide, carbonate, sulfate or silicate to polypropylene which has been modified, for example, by graft-polymerization of maleic anhydride or the like. Although this patent publication discloses single use of calcium stearate or silica or combined use of calcium stearate and stearic acid or calcium stearate and silica in its Examples, it does not teach anything about reutilization of scraps from molding or forming operations.

It is also disclosed in Japanese Patent Laid-Open No. 93449/1980 to add a metal salt of an organic acid such as calcium oleate in order to improve the bonding strength. Here again, it does not recite anything as to reutilization of such scraps.

The above-described prior art techniques are all dependent on improvements by the modified polypropylenes themselves. Since these modified polypropylenes are themselves costly, they are usually employed only in bonding layers with a view toward exhibiting their effects while using them as little as possible. Accordingly, multi-layered containers are usually produced with unmodified polypropylene layers as their principal component layers. Under the circumstances, no solution has however been provided yet as to problems which are encountered upon reutilization of scraps occurring from the molding and the like of these resin products.

According to a novel finding by the present inventors, it has been recognized that when scraps of such multi-layered containers containing unmodified polypropylene as their principal component layers are recycled and reutilized as a mixture with polypropylene, the extrusion processing stability is reduced significantly and burning tends to occur in the screw or die area. Occurrence of such burning leads to a considerable economical loss, because the inclusion of a contaminant in products due to burnt resin discolored to a yellow or brown color substantially impairs their function as gas barrier containers or chemical resistant containers and hence considerably reduces their commercial values and occurrence of burning during an operation requires termination of the operation and disassembly and cleaning of the molding machine.

SUMMARY OF THE INVENTION

An object of this invention is to provide a resin composition capable of showing excellent thermal processing stability in an extruder when a scrap of multi-layered products is reutilized by subjecting it to extrusion molding either singly or in combination with a virgin resin.

Another object of this invention is to provide a polypropylene resin composition suitable for use in reutilizing a scrap of containers or sheets, each of which is formed of a layer composed principally of a polypropylene resin composition and another layer composed of a material containing nylon or an ethylenevinyl alcohol copolymer, by mixing the scrap with the polypropylene resin composition. Other objects of this invention are to provide a process for the production of a multi-layered container or sheet by using such a resin composition and also to provide such a multi-layered molded or formed article.

The above-described objects of this invention can be attained by using a polypropylene resin composition comprising 100 parts by weight of polypropylene, 0.05–1 part by weight of a metal salt of a fatty acid, and 0.01–1 part by weight of the oxide and/or hydroxide of an alkaline earth metal.

The polypropylene resin composition of this invention shows excellent thermal processing stability during its extrusion molding. Even when a scrap from the production of multi-layered molded or formed articles is mixed, occurrence of burning is reduced significantly so that a molded or formed article of good quality can be obtained.

DETAILED DESCRIPTION OF THE INVENTION

By the term "polypropylene" as used herein, polypropylene homopolymer is generally meant. It may however embrace copolymers of propylene and small amounts of other $\alpha$-olefins as well as polymer blends of such polypropylene homopolymer or copolymers and small amounts of other resins, rubbers or the like. These polypropylene resins may each contain one or more of antioxidants, antistatic agents, nucleating agents, colorants, fillers and so on.

The metal salt of the fatty acid, which is useful in the practice of this invention, means the salt of a higher fatty acid having, for example, 11-21 carbon atoms such as oleic acid, stearic acid or palmitic acid and a metal such as calcium, magnesium, zinc or aluminum. Among these, it is preferable to use calcium stearate or zinc stearate.

On the other hand, magnesium hydroxide, magnesium oxide, calcium hydroxide, barium hydroxide and barium oxide may be mentioned as exemplary oxides and hydroxides of alkaline earth metals. Among these, it is preferable to use magnesium hydroxide or magnesium oxide.

The critical feature of this invention resides in the combined use of the metal salt of the fatty acid and the oxide and/or hydroxide of the alkaline earth metal. It has conventionally been well-known to incorporate a small amount of a metal salt of a fatty acid in a polyolefin. For example, calcium stearate is added to polypropylene to serve as a scavenger for hydrochloric acid which is formed upon decomposition of a catalyst. However, the metal salt of the fatty acid is not significantly effective for the prevention of occurrence of burning upon extrusion when it is used alone. Likewise, the oxide and/or hydroxide of the alkaline earth metal such as magnesium hydroxide or magnesium oxide does not exhibit remarkable effects for the prevention of occurrence of burning when it is used alone. The thermal processing stability of polypropylene has now been improved remarkably for the first time by the present invention, namely, by using the metal salt of the fatty acid and the oxide and/or hydroxide of the alkaline earth metal in combination within their respective specific amount ranges. As a result, the present invention has brought about remarkable effects that the occurrence of resin burning on the screw or in the die of an extruder can be reduced significantly even when a resin having gas barrier properties such as an ethylene-vinyl alcohol copolymer is mixed.

The metal salt of the fatty acid is added in an amount ranging from 0.05-1 part. Any amounts smaller than 0.05 part show little effects for the prevention of burning, whereas any amounts greater than 1 part result in bleeding of the metal salt of the fatty acid from the resins. It is therefore not desirable to use the metal salt of the fatty acid in any amounts outside the above range. On the other hand, the oxide and/or hydroxide of the alkaline earth metal is added in a total amount ranging from 0.01-1 part. It is not desirable to add the oxide and/or hydroxide of the alkaline earth metal in any amounts outside the above-specified range, because any amounts smaller than 0.01 part exhibit little effects for the prevention of burning and any amounts greater than 1 part lead to reduced transparency.

No particular limitation is imposed on the preparation process per se of the resin composition of this invention. It may be prepared, for example, by mixing polypropylene powder, the metal salt of the fatty acid, and the oxide and/or hydroxide of the alkaline earth metal and in some instances, one or more other additives in a high-speed rotary mixer and then causing the resultant mixture to pass through an extruder, thereby melting and kneading the mixture and then pelletizing same. It may also be obtained by preparing a master batch, which contains the metal salt of the fatty acid and the oxide and hydroxide of the alkaline earth metal along with polypropylene as a base resin, and then blending the master batch with a polypropylene resin.

The above-described polypropylene resin composition of this invention is useful particularly as a multi-layer molding material. As a matching molding material in its multi-layer molding, a gas barrier resin such as nylon or an ethylene-vinyl alcohol copolymer or a material containing such a resin is preferred. As a preferred specific embodiment of its utilization, may be mentioned a multi-layered container or sheet formed of a layer of nylon or an ethylene-vinyl alcohol copolymer and another layer of the polypropylene resin composition of the present invention. As nylon useful in the above embodiment, may be mentioned nylon 6, nylon 66 or nylon 610 as a preferred example. On the other hand, an ethylenevinyl alcohol copolymer having an ethylene content of 10-80 mole %, preferably, 20-50 mole % and a saponification degree of at least 90 mole %, preferably, at least 95 mole % may be mentioned as a preferable ethylene-vinyl alcohol copolymer.

The polypropylene resin composition of this invention is particularly useful as a composition for permitting the mixing of a scrap or the like, which occurs upon production the above-described molded articles, for its reutilization. The mixing proportion of the scrap or the like in the composition for its reutilization may generally be within a range of 1-6 wt. % in terms of the amount of the ethylene-vinyl alcohol copolymer by way of example. The utility of the resin composition of this invention is exhibited as such a polypropylene resin composition.

A scrap occurs when multi-layered molded or formed articles, each of which is formed of a layer of a gas barrier resin such as nylon or an ethylene-vinyl alcohol copolymer and another layer of a polypropylene resin composition which may or may not contain nylon of an ethylene-vinyl alcohol copolymer, are produced usually by the melt co-extrusion process. The scrap may be mixed with a polypropylene resin composition which may or may not contain nylon or an ethylene-vinyl alcohol copolymer and the resultant mixture is again subjected to melt extrusion to form a layer of a polypropylene resin composition. As specific effects of the polypropylene resin composition of this invention, it can improve the thermal stability of the mixture upon its melt extrusion. The polypropylene resin composition of this invention is hence effective especially when scraps are recycled, for example, at a constant rate in a range of 20-50% or so. Useful scraps may include, for example, trimming losses when multi-layered sheets are thermally molded into containers or losses when containers are formed from multi-layered parisons.

When a multi-layered container or sheet is produced in the above-described manner, formation of contaminants due to burning of the resin is not observed on the screw or in the die of the extruder. Even when a thin film, for example, having a thickness of 25 μm is formed, occurrence of pin holes, inclusion of contaminants, formation of fish eyes, etc, are not observed. The polypropylene resin composition of this invention is therefore useful as a multi-layer molding material with another resin having gas barrier properties.

This invention will hereinafter be described in detail by the following Examples.

EXAMPLE 1

To 100 parts by weight of polypropylene powder, were added 0.1 part by weight of calcium stearate, 0.1 part by weight of magnesium hydroxide and 0.1 part by weight of 2,6-di-tert-butyl-p-cresol as an antioxidant. After mixing the resultant mixture in a Henschel mixer, it was extruded at 230° C. through an extruder to obtain polypropylene (hereinafter abbreviated as "PP") pellets. Their melt flow index was 1.2 g/10 minutes. The PP pellets were then added with 2 wt. % of an ethylene-vinyl alcohol copolymer [hereinafter abbreviated as "EVOH"; ethylene content: 30 mole %; saponification degree: 98% or higher; "Eval" (trade mark), product of Kuraray Co., Ltd.]. An extruder having a barrel diameter of 30 mm (L/D=22) was provided and its temperature was set at 210° C. ($C_1$), 250° C. ($C_2$), 250° C. ($C_3$), and 250° C. (die) respectively.

The above-prepared mixture was then extruded as pellets at a delivery rate of 4 kg/hr for 2 hours. The screw was free from deposition of burnt resin and the die was completely free from deposition of burnt resin. A 25 μm thick film was formed at a resin temperature of 220° C. -from the thus-obtained pellets by means of a film extruder equipped with a T-die. Neither occurrence of pin holes not formation of contaminants due to burnt resin was observed. The film had good quality.

EXAMPLE 2

PP pellets were mixed with EVOH in an amount of 6 wt. % instead of 2 wt. %. The resultant mixture was extruded as pellets in the same manner as in Example 1, followed by formation of a film. Similar to Example 1, deposition of burnt resin was not observed on the screw or in the die of the extruder and the resulting film of 25 μm thick was found to be free of contaminants.

Comparative Example 1

PP pellets were obtained in the same manner as in Example 1 except that magnesium hydroxide was not added. PP pellets were then added with 2 wt. % of EVOH, followed by extrusion as pellets for 2 hours. Substantial deposition of burnt resin was observed on the screw. The deposited resin had a yellow color. Further, 792 mg of a deposit of burnt resin was collected from the die. The resulting pellets were formed into a 25 μm thick film in the same manner as in Example 1. A number of contaminants due to burnt resin was observed in the film.

Comparative Example 2

PP pellets were obtained in the same manner as in Example 1 except for the omission of calcium stearate. Following the procedure of Example 1, 2 wt. % of EVOH was mixed and the resultant mixture was extruded as pellets for 2 hours. A deposit of burnt resin having a yellow color was observed at a tip portion of the screw. From the die, 130 mg of a deposit of burnt resin was collected. The resulting pellets were formed into a 25 μm thick film. Inclusion of contaminants due to burnt resin was observed in the film.

EXAMPLE 3

PP pellets were obtained in the same manner as in Example 1 except that 0.2 part by weight of zinc stearate was added in lieu of calcium stearate and 0.1 part by weight of magnesium oxide was incorporated instead of magnesium hydroxide. PP pellets were then added with 2 wt. % of EVOH, followed by extrusion as pellets for 2 hours. The screw was free from deposition of burnt resin. No deposit of burnt resin was observed in the die. A 25 μm thick film was obtained in the same manner as in Example 1. It contained no contaminants and had good quality.

EXAMPLE 4

Extrusion as pellets was conducted in the same manner as in Example 1 except that 6 wt. % of a nylon resin ["CM 1041" (trade name), product of Toray Industries, Inc.] was mixed in place of 2 wt. % of EVOH. No deposition of burnt resin was observed on the screw and die. A 25 μm thick film was obtained in the same manner as in Example 1. Neither pin holes nor inclusion of contaminants due to burnt resin were observed. The film had good external appearance.

Comparative Example 3

Extrusion as pellets was effected in the same manner as in Example 4 except for the omission of magnesium hydroxide. As a result, no deposit of burnt resin was observed on the screw and die. However, a number of fish eyes of about 0.1–0.3 mm was recognized when the above-prepared pellets were formed into a 25 μm thick film. Accordingly, the film had no commercial value.

EXAMPLE 5

PP pellets were obtained in the same manner as in Example 1 except that the amount of calcium stearate was changed to 0.2 parts by weight and 0.1 part by weight of magnesium oxide was added. PP pellets were then added with 3 wt. % of EVOH, followed by extrusion as pellets for 2 hours. The screw was free from deposit of burnt resin. No deposit of burnt resin was observed in the die. A 25 μm thick film was formed in the same manner as in Example 1. The film was free from contaminants and had good quality.

EXAMPLE 6

A laminated sheet was extruded by means of a sheet co-extruder in such a way that the laminated sheet had a structure composed of 3 types of resins in 5 layers, namely, PP layers formed of the PP pellets obtained in Example 1, adhesive PP layers and an EVOH layer were arranged in the order of PP/adhesive PP/EVOH-/adhesive PP/PP. The PP layers, adhesive PP layers and EVOH layer were about 0.35 mm, about 0.05 mm and about 0.05 mm thick respectively and the overall thickness was about 0.85 mm.

Containers were thermally molded from the laminated sheet. Trimmed parts were ground as a scrap. The scrap was mixed at a mixing ratio of 35% with the above-obtained PP pellets and in the same manner as described above, a laminated sheet composed of 3 types of resins in 5 layers, namely, having a structure of PP+scrap/adhesive PP/EVOH/adhesive PP/PP+ scrap was obtained. Thermal molding and scrap reutilization were repeated.

The average content of EVOH in the PP and scrap layer was 2-3%. No deposition of burnt resin was observed on the screw, die or the like of the extruder during the formation of the laminated sheet. Neither occurrence of pin holes nor inclusion of contaminants due to burnt resin was observed in the laminated sheet.

We claim:

1. A polypropylene resin composition comprising:
   (a) 100 parts by weight of polypropylene containing nylon or ethylene-vinyl alcohol copolymer within a range of 1 to 6 weight percent, said nylon or ethylene-vinyl alcohol copolymer being contained in a recycled scrap which is the scrap of co-extruded multi-layered products, the layers of which scrap are formed of at least one layer of said nylon or ethylene-vinyl alcohol copolymer and at least one layer of a polypropylene resin composition;
   (b) 0.05 to 1 part by weight of a metal salt of a fatty acid having 11 to 21 carbon atoms; and
   (c) 0.01 to 1 part by weight of at least one compound selected from the group consisting of (i) magnesium oxide, (ii) magnesium hydroxide, and (iii) magnesium oxide and magnesium hydroxide.

2. The polypropylene resin composition as claimed in claim 1 wherein the metal salt of the fatty acid is the salt of a higher fatty acid selected from the group consisting of oleic acid, stearic acid and palmitic acid.

3. The polypropylene resin composition as claimed in claim 1 wherein the ethylene-vinyl alcohol copolymer has an ethylene content of 10 to 80 mole percent and a saponification degree of at least 90 mole percent.

4. The polypropylene resin composition as claimed in claim 1 wherein said polypropylene resin composition layer of said scrap contains 100 parts by weight of polypropylene, 0.05 to 1 part by weight of a metal salt of a fatty acid having 11 to 21 carbon atoms and 0.01 to 1 part by weight of magnesium oxide, magnesium hydroxide, or a mixture of magnesium oxide and magnesium hydroxide.

5. A multi-layered sheet comprising at least a layer made of nylon or an ethylene-vinyl alcohol copolymer and at least another layer made of a propypropylene resin composition which comprises:
   (a) 100 parts by weight of polypropylene containing nylon or ethylene-vinyl alcohol copolymer within a range of 1 to 6 weight percent, said nylon or ethylene-vinyl alcohol copolymer being contained in a recycled scrap which is the scrap of co-extruded multi-layered products, the layers of which scrap are formed of at least one layer of said nylon or ethylene-vinyl alcohol copolymer and at least one layer of a polypropylene resin composition;
   (b) 0.05 to 1 part by weight of a metal salt of a fatty acid having 11 to 21 carbon atoms; and
   (c) 0.01 to 1 part by weight of at least one compound selected from the group consisting of (i) magnesium oxide, (ii) magnesium hydroxide, and (iii) magnesium oxide and magnesium hydroxide.

* * * * *